United States Patent [19]

Hull

[11] Patent Number: 4,903,530

[45] Date of Patent: Feb. 27, 1990

[54] LIQUID LEVEL SENSING SYSTEM

[76] Inventor: Harold L. Hull, 401 Canyon Way Sp. 43, Spanks, Nebr. 89431

[21] Appl. No.: 281,065

[22] Filed: Dec. 8, 1988

[51] Int. Cl.⁴ .............................................. G01F 23/24
[52] U.S. Cl. .................... 73/304 R; 73/308; 73/313; 338/28; 340/620
[58] Field of Search ...................... 73/308, 304 R, 313, 73/301; 340/620, 815.03, 762; 338/28

[56] References Cited

U.S. PATENT DOCUMENTS

| | | | |
|---|---|---|---|
| 3,873,979 | 3/1975 | Craford et al. | 340/815.03 |
| 4,090,355 | 5/1978 | Morohoshi | 340/815.03 X |
| 4,316,174 | 2/1982 | Sutton et al. | 340/620 X |
| 4,744,640 | 5/1988 | Phillips | 350/388 |

OTHER PUBLICATIONS

"Multi-Color LEDs", Electronic Service Instrument, Herrick, Prentice Hall, 1974, (340/620), pp. 42-43.

Primary Examiner—Daniel M. Yasich

[57] ABSTRACT

Multiple contact sensors located at axially spaced measurement zones, inside or outside of an elongated probe, closes a variable resistance circuit through the conducting substance being monitored, with monitoring means being a three-way or multicolored light emitting diode, which in connection with an AC power source and a transistor, changes color and luminosity as the substance being monitored reaches the various levels of the contact sensors.

6 Claims, 1 Drawing Sheet

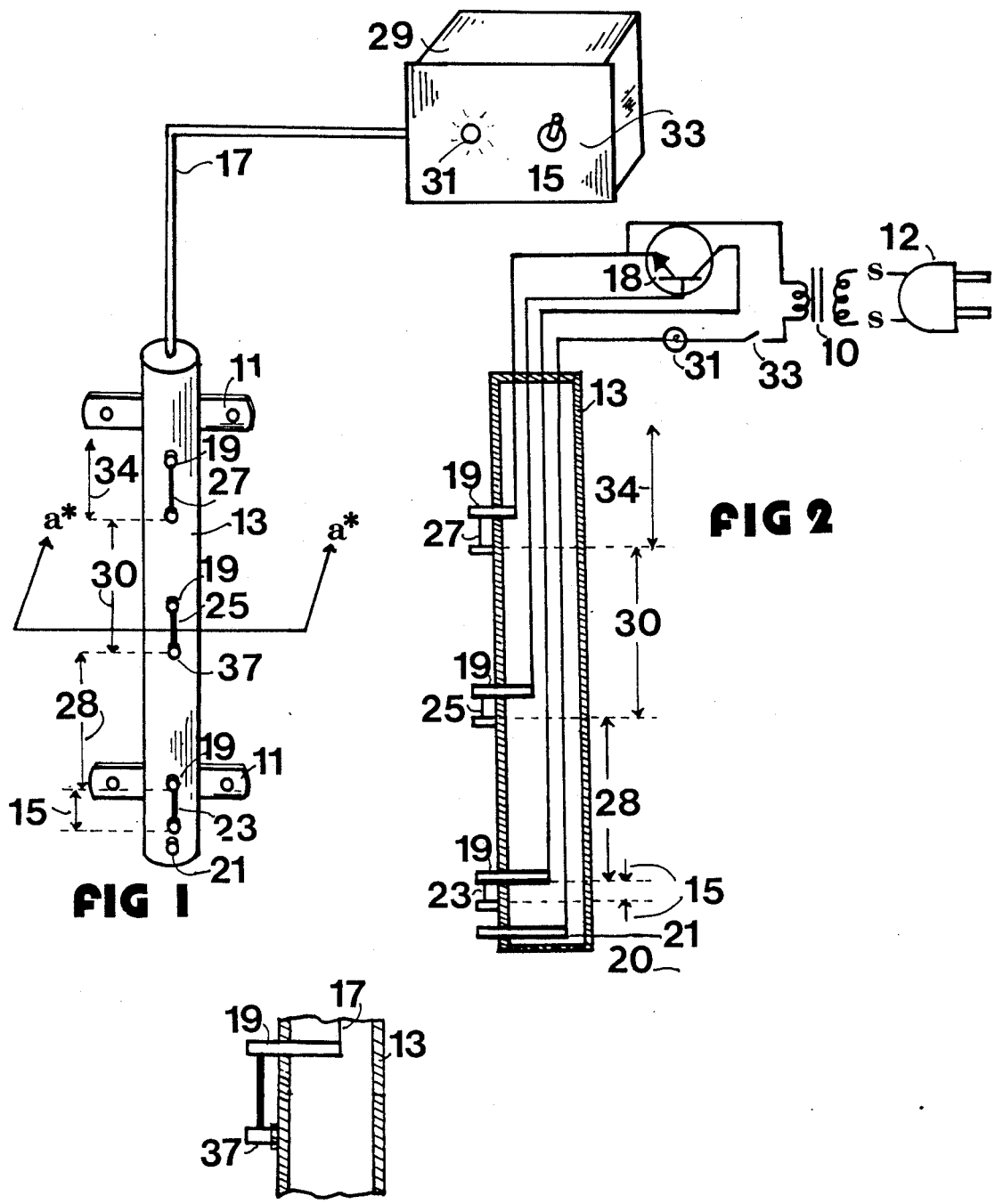

LIQUID LEVEL SENSING SYSTEM

This invention relates to a liquid level sensing apparatus and system for use in a wide variety of equipment requiring the monitoring of liquid tanks such as spas, swimming pools, water tanks, etc.

BACKGROUND OF THE INVENTION

The concept of monitoring liquid such as water in a container to determine its depth or level in terms of some predetermined level and providing an electrical signal to indicate said change of level is not new. Many methods have been taught such as floats, thermocouples, sonic and temperature sensors, light reflections means, and other complicated mechanical apparatus and electrical circuits and components involving radioactive means, heat streams, amplifiers, etc. In the prior art a great amount of mechanical apparatus and electrical components and circuits have been used which require a large amount of space and expensive monitoring equipment which requires maintenance and qualified personnel to operate. Such level sensing arrangements and apparatus are also subject to signal error because of varying heat flow and temperature conditions of the liquid between measurement zones. Such signal errors are not capable of being reliably corrected by accumulated error data because of the often unpredictable nature of heat flow conditions within the liquid body being monitored.

OBJECTS AND ADVANTAGES

It is an object of my invention to provide a simple, reliable, liquid level sensing system that does not depend on heat or temperature as a sensing means.

Another object is to provide an indicating system that requires only one bulb or light which indicates by its color and luminocity the level of the liquid.

Still another object is to provide a system which can remotely monitor the level of the liquid which any unskilled person can understand by simply noting the color of the indicating light.

Yet another object is to provide a system which can monitor a number of levels which may be very close together or far apart.

Still another object is to provide a system which can monitor a number of levels which are either in a static state or a moving state or "splash" levels.

Another object is to provide a system which is accumulative error free.

SUMMARY OF THE INVENTION

In accordance with the present invention, an elongated probe is provided which contain leads with one end terminating at the outside or inside of the probe at different levels which allows said exposed leads to contact the liquid when the liquid rises to the level of each contact.

The contacts are made of non-corrosive material such as stainless steel, or any of a number of suitable alloys, which also will keep electrolysis at a minimum. Also the contacts may be made of fine gauge wire which allows more current flow when more of the wire is covered with liquid thus making the indicating diode more luminous. These contact wires may be mounted on standoff posts on or in the probe or may be attached to the side of the probe but in neither case are mounted in a vertical position to allow more of the contact wire to be covered as the liquid rises. The body of the probe can be made of plastic or stainless steel or other suitable material depending on the application.

The other ends of the wire leads terminate at a station which may be remotely located from the container thus allowing monitoring of the various levels a long distance away from the container. Also, the probes may be "ganged," that is, a number of them each above another, all terminating at a remote station thus allowing monitoring of many minute levels as required.

The circuitry consist of a simple AC power supply of low voltage such as 12 volts which, of course, may be supplied by a battery and converted to AC, a three-way bulb, a transistor, a switch and suitable wiring harness.

Other objects and advantages will become obvious when taken in consideration with the following drawings:

DESCRIPTION OF THE DRAWINGS

FIG. 1 is a front perspective view of the system showing the probe, wire harness and the indicating box and panel.

FIG. 2 is a simplified partial side section view through a liquid level monitoring probe assembly in accordance with one embodiment of the invention, in association with a schematically illustrated signal processing system.

FIG. 3 is a partial side section view through a liquid level monitoring probe taken at a*—a*.

DETAILED DESCRIPTION OF THE DRAWINGS

Referring now to the drawings, 13 is the body or casing of a probe while 15 is a monitoring panel containing indicator light 31 which is a tri-color light emitting diode that glows red when DC voltage is applied, glows green when reverse DC voltage is applied and glows yellow when AC is applied, such as is provided by THREE-FIVE SEMICONDUCTOR, INC. of Phoenix, Ariz., while 29 is an electrical box, 33 is an on/off switch, 17 is a suitable wiring harness with 11 being suitable mounts for probe 13, 19 being a typical conducting standoff for supporting contact elements 23,25, and 27 while 37 is a non-conductive standoff for supporting the opposite end of contact element 23, 25 and 27, while 21 is a conductive standoff, 10 being a stepdown transformer such as 110/12 volts with AC supply 12 with 18 being a transistor such as RADIO SHACKS #2023, while 28 shows the red indicating zone, 30 shows the green indicating zone and 34 shows the yellow indicating zone with 20 being the liquid being sensed.

OPERATION

It will be seen that the circuit is energized by line voltage 12 through transformer 10, switch 33, transistor 18 and LED 31 and when the liquid level 20 covers the contact 21 and the bottom end of wire element 23 and enters the bottom of zone 15, that the LED 31 will begin to dimly glow red and as the liquid level 20 rises, covering more of contact element 23, then the resistance of the circuit decreases making the LED 31 glow a brighter red. When the entire contact element 23 is completely covered the LED 31 glows a bright red and continues to glow a bright red as long as the liquid level is anywhere in zone 28. When the liquid level 20 reaches the bottom of contact element 25 and a circuit is formed the LED 31 will dimly glow green and as the liquid level 20 rises, covering more of contact element 25, the resistance of that circuit decreases making the LED 31 glow a brighter green and when the entire contact element 25 is completely covered, the LED 31 glows a bright green and continues to glow a bright green as long as the liquid level is in zone 30. Now when the liquid level 20 reaches the bottom of contact element 27, and a circuit is formed the LED 31 will dimly glow yellow and as the liquid level 20 rises, covering more of contact element 27, the resistance of that circuit decreases making the LED 31 glow a brighter yellow and when the entire contact element 27 is completely covered the LED 31 glows a bright yellow. The A.C. current as shown in FIG. 2 is supplied by transformer 10 while D.C. current and reverse D.C. current is supplied as shown by FIG. 2 through transistor 18.

It will now be seen that by positioning another probe assembly above or below the first probe that a second LED may be energized, etc, so that any number of levels may be monitored.

It will also be seen that I have provided a simple liquid level monitoring system that involves no mechanical parts which need servicing or replacing.

Also I have provided a system that requires only one LED that indicates by its color and luminosity, the level of the liquid being monitored.

It have also provided a system that requires very low voltage that may be monitored at a remote station distant from the container being monitored.

Also the design of the probe can be such as to monitor very short or very long increments.

It will also be noted that the liquid being monitored may be in a static or a moving state and even "splash" level may be noted.

I have also provided a system that is non-accumulative in error.

Although the invention has been herein shown and described in what is conceived to be the most practical and preferred embodiment, it is recognized that departures may be made therefrom within the scope of the invention, which is not to be limited to the details disclosed herein but it is to be accorded the full scope of the claims so as to embrace any and all equivalent devices and apparatus.

Having described my invention, what I claim as new and desire to secure by Letters Patent is:

1. A liquid level sensor conductive system comprising; means to connect to a power source, a probe, means for mounting said probe in a liquid conductive substance, a plurality of spaced contact elements cooperating with said probe, means for mounting said probe and said spaced contact elements at various pre-determined levels of said liquid conductive substance, a tri-colored light emitting diode in an indicating electrical box unit, means to change the current flow to said diode from direct current to reverse direct current to alternating current, means to conduct said current flow from said means to connect to a power source, through said diode, through said means to change the direction of current flow and through said contact elements when said contact elements are covered with said liquid conductive substance.

2. The device of claim 1 in which said contact elements are substantially longer in their length than in their girth.

3. The device of claim 1 in which said contact elements are mounted on said probe in a vertical position.

4. The device of claim 1 in which said means to change the current flow from direct current to reverse direct current is a transistor.

5. The device of claim 1 in which said probe and said contact elements are made of corrosive resistant materials.

6. The device of claim 1 in which said liquid conductive substance is water.

* * * * *